US012686287B2

(12) United States Patent (10) Patent No.: US 12,686,287 B2

Lin et al. (45) Date of Patent: Jul. 21, 2026

(54) CHARGING GUN COOLING SYSTEM AND CHARGING GUN

(71) Applicant: Luxshare Precision Industry (Jiangsu) Co.,Ltd., Liyang (CN)

(72) Inventors: Peiquan Lin, Liyang (CN); Xiangfeng Shen, Liyang (CN); Xingran Tang, Liyang (CN); Yunbo Linghu, Liyang (CN)

(73) Assignee: LUXSHARE PRECISION INDUSTRY (JIANGSU) CO., LTD., Jiangsu (CN)

( * ) Notice: Subject to any disclaimer, the term of this patent is extended or adjusted under 35 U.S.C. 154(b) by 893 days.

(21) Appl. No.: 17/989,802

(22) Filed: Nov. 18, 2022

(65) Prior Publication Data

US 2023/0166611 A1 Jun. 1, 2023

(30) Foreign Application Priority Data

Nov. 19, 2021 (CN) .......................... 202111382213.1

(51) Int. Cl.
B60L 53/302 (2019.01)
B60L 53/16 (2019.01)
(Continued)

(52) U.S. Cl.
CPC ............. B60L 53/302 (2019.02); B60L 53/16 (2019.02); H01R 13/5025 (2013.01);
(Continued)

(58) Field of Classification Search
CPC ............................... B60L 53/302; B60L 53/16
(Continued)

(56) References Cited

U.S. PATENT DOCUMENTS

2020/0234853 A1 7/2020 Lee et al.
2020/0307400 A1* 10/2020 de Chazal ............... B60L 53/16
2020/0376970 A1 12/2020 Berggren et al.

FOREIGN PATENT DOCUMENTS

CN 105811184 A 7/2016
CN 109177783 A 1/2019
(Continued)

OTHER PUBLICATIONS

Chinese Office Action and Search Report for Chinese Application No. 202111382213.1, dated Apr. 18, 2024, with English translation.

*Primary Examiner* — Nathaniel R Pelton

(74) *Attorney, Agent, or Firm* — Birch, Stewart, Kolasch & Birch, LLP

(57) ABSTRACT

Provided are a charging gun cooling system and a charging gun, relating to the technical field of charging guns. In the charging gun cooling system, a head cooling assembly includes a support frame and a cooling cavity, the cooling cavity is provided with a liquid inlet and a liquid outlet, the support frame is configured to accommodate a connection end of a first terminal and a connection end of a second terminal, the cooling cavity is disposed in the support frame and between the first terminal and the second terminal, a liquid inlet pipe communicates with the liquid inlet, a liquid outlet pipe communicates with the liquid outlet, a first cable is laid on the outer surface of the liquid inlet pipe, and a second cable is laid on the outer surface of the liquid outlet pipe.

20 Claims, 7 Drawing Sheets

(51) Int. Cl.

| | |
|---|---|
| *H01R 13/502* | (2006.01) |
| *H01R 13/04* | (2006.01) |
| *H01R 13/66* | (2006.01) |

(52) U.S. Cl.
CPC .......... *H01R 13/04* (2013.01); *H01R 13/6683* (2013.01); *H01R 2201/26* (2013.01)

(58) Field of Classification Search
USPC ......................................................... 320/109
See application file for complete search history.

(56) References Cited

FOREIGN PATENT DOCUMENTS

| | | | |
|---|---|---|---|
| CN | 208383330 | * | 1/2019 |
| CN | 208383330 | U | 1/2019 |
| CN | 208754008 | U | 4/2019 |
| CN | 110600168 | A | 12/2019 |
| CN | 111755864 | A | 10/2020 |
| CN | 108806851 | B | 1/2021 |
| CN | 113328288 | * | 8/2021 |
| CN | 113328288 | A | 8/2021 |
| CN | 113400968 | * | 9/2021 |
| CN | 113400968 | A | 9/2021 |
| CN | 113488803 | A | 10/2021 |
| CN | 216507940 | U | 5/2022 |
| JP | 2017-220355 | A | 12/2017 |
| TW | M571327 | U | 12/2018 |

* cited by examiner

CHARGING GUN COOLING SYSTEM AND CHARGING GUN

CROSS-REFERENCE TO RELATED APPLICATION

This application claims priority to Chinese Patent Application No. 202111382213.1 filed Nov. 19, 2021, the disclosure of which is incorporated herein by reference in its entirety.

TECHNICAL FIELD

The present disclosure relates to the technical field of charging guns and, in particular, to a charging gun cooling system and a charging gun.

BACKGROUND

With the popularization of new energy electric vehicles, the development of direct-current fast charging technology has become more and more important. A direct-current charging gun is an important component thereof, and many mature direct-current charging gun products have emerged on the market. To improve the charging speed, shorten the charging time and improve the user experience, the charging current and the power that the direct-current charging gun uses to charge a load certainly grow greater and greater.

In a charging process of an electronic vehicle when the charging current ranges from 500 A to 600 A, a large amount of heat is generated at the joint between a cable, a first charging terminal and a second charging terminal and at the joint between a cable and an external power supply. As a result, the temperature increases, thereby reducing the charging efficiency. Moreover, a high temperature may cause great damage to the charging gun, and an excessive temperature may even cause a fire.

SUMMARY

The present disclosure provides a charging gun cooling system and a charging gun to reduce the temperature at the joint between a cable and a first terminal and the temperature at the joint between the cable and a second terminal.

To achieve the preceding object, the present disclosure adopts the solutions below.

In one aspect, the present disclosure provides a charging gun cooling system. The charging gun cooling system includes a head cooling assembly, a liquid inlet pipe and a liquid outlet pipe. The head cooling assembly includes a support frame and a cooling cavity. The cooling cavity is provided with a liquid inlet and a liquid outlet. The support frame is configured to accommodate a connection end of a first terminal and a connection end of a second terminal. The cooling cavity is disposed in the support frame and between the first terminal and the second terminal. The liquid inlet pipe communicates with the liquid inlet. The liquid outlet pipe communicates with the liquid outlet. An outer surface of the liquid inlet pipe is for a first cable to be laid on. An outer surface of the liquid outlet pipe is for a second cable to be laid on. The first cable is connected to the connection end of the first terminal. The second cable is connected to the connection end of the second terminal.

In an embodiment, the cooling cavity includes a first liquid storage region, a second liquid storage region and a communication region connecting the first liquid storage region and the second liquid storage region, the liquid inlet communicates with the first liquid storage region, the liquid outlet communicates with the second liquid storage region, the first liquid storage region is adjacent to the connection end of the first terminal, and the second liquid storage region is adjacent to the connection end of the second terminal.

In an embodiment, an inner wall of the cooling cavity is provided with a flow deflector, and the flow deflector is positioned in the communication region and extends a predetermined height along the height direction of the cooling cavity.

In an embodiment, two liquid inlets and two liquid outlets are provided, each liquid inlet communicates with one liquid inlet pipe, each liquid outlet communicates with one liquid outlet pipe, the two liquid inlets are spaced apart in the first liquid storage region along the height direction of the cooling cavity, and the two liquid outlets are spaced apart in the second liquid storage region along the height direction of the cooling cavity.

In an embodiment, the head cooling assembly further includes a first heat conductive member, and the first heat conductive member is disposed between the connection end of the first terminal and the cooling cavity and/or between the connection end of the second terminal and the cooling cavity.

In an embodiment, the head cooling assembly further includes a second heat conductive member, and the second heat conductive member is disposed between the connection end of the first terminal and the support frame and/or between the connection end of the second terminal and the support frame.

In an embodiment, the head cooling assembly further includes a temperature detector, the second heat conductive member is provided with an installation groove, and the temperature detector is disposed inside the installation groove and configured to detect a temperature at the connection end of the first terminal and/or temperature at the connection end of the second terminal.

In an embodiment, the connection end of the first terminal and the connection end of the second terminal are each flat plate-shaped and each have a planar cable connection face, and the cable connection face is vertical to the direction in which the first terminal and the second terminal are arranged.

In an embodiment, a tail cooling assembly is further included, and the tail cooling assembly includes two connection boxes, each connection box is configured to accommodate a conductive member, the first conductive members in the two connection boxes are respectively for the first cable and the second cable to be connected to, and the liquid inlet pipe and the liquid outlet pipe each extend through the respective one of the two connection boxes.

In an embodiment, each connection box includes a box body and a cover. The box body is provided with a first lower through groove, a second lower through groove and a third lower through groove. The cover is provided with a first upper through groove, a second upper through groove and a protruding block. When the cover covers the box body, the first lower through groove and the first upper though groove form a first channel, the second lower through groove and the second upper through groove form a second channel, the third lower through groove and the protruding block form a third channel, the liquid inlet pipe and the liquid outlet pipe each extend into the respective one of the two connection boxes via the second channel and then out of the first channel, and the first conductive member extends into each connection box via the third channel.

In an embodiment, each connection box further includes a first seal ring, a second seal ring and a third seal ring. The first seal ring, the second seal ring and the third seal ring are configured to seal the first channel, the second channel and the third channel respectively.

In an embodiment, the first seal ring, the second seal ring and the third seal ring are each provided with an annular avoidance groove in a circumferential direction, each connection box further includes a seal strip, the end face of the box body facing the cover is provided with a first annular groove, the end face of the cover facing the box body is provided with a second annular groove; and when the cover covers the box body, the first annular groove, the second annular groove and the annular avoidance groove form a seal chamber, and the seal strip is disposed inside the seal chamber.

In another aspect, the present disclosure provides a charging gun, and the charging gun includes the charging gun cooling system, the first terminal, the second terminal, the first cable and the second cable according to any of the preceding solutions. The connection end of the first terminal and the connection end of the second terminal are both disposed in the support frame. The cooling cavity is positioned between the first terminal and the second terminal. The outer surface of the liquid inlet pipe is for the first cable to be laid on, and the first cable is connected to the connection end of the first terminal. The liquid outlet pipe is for the second cable to be laid on, and the second cable is connected to the connection end of the second terminal.

In an embodiment, the connection end of the first terminal and the connection end of the second terminal are each flat plate-shaped and each have a planar cable connection face, one end of the first cable is secured to the cable connection face of the first terminal in a distributed manner, and one end of the second cable is secured to the cable connection face of the second terminal in the distributed manner.

In an embodiment, the head cooling assembly further includes the first heat conductive member and the second heat conductive member, the first heat conductive member encases the connection end of the first terminal and leaves the cable connection face of the first terminal exposed and/or encases the connection end of the second terminal and leaves the cable connection face of the second terminal exposed, the second heat conductive member is disposed between the connection end of the first terminal and the support frame and/or between the connection end of the second terminal and the support frame, the first heat conductive member and the second heat conductive member are each U-shaped, and the opening of the first heat conductive member and the opening of the second heat conductive member are opposite to each other.

REFERENCE LIST

Figure 1:
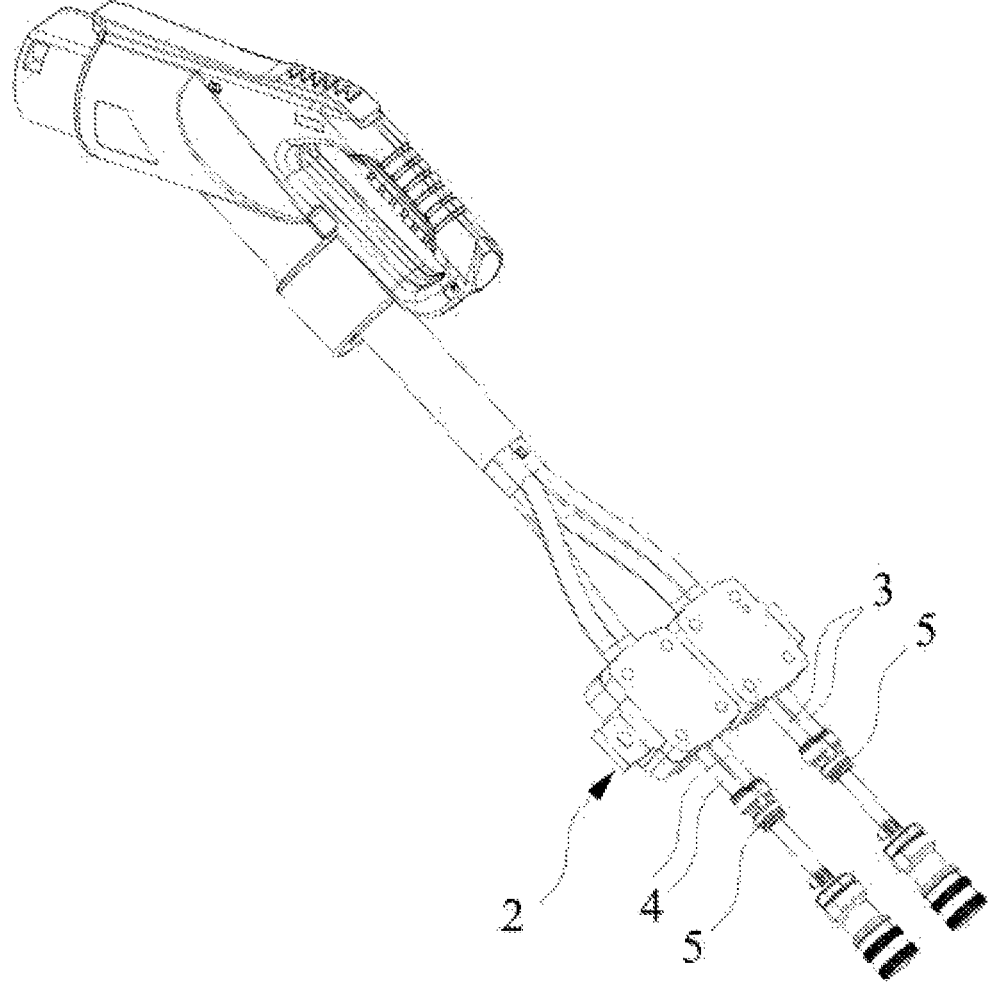
FIG. 1 is a view illustrating the structure of a charging gun according to embodiments of the present disclosure.
Figure 2:
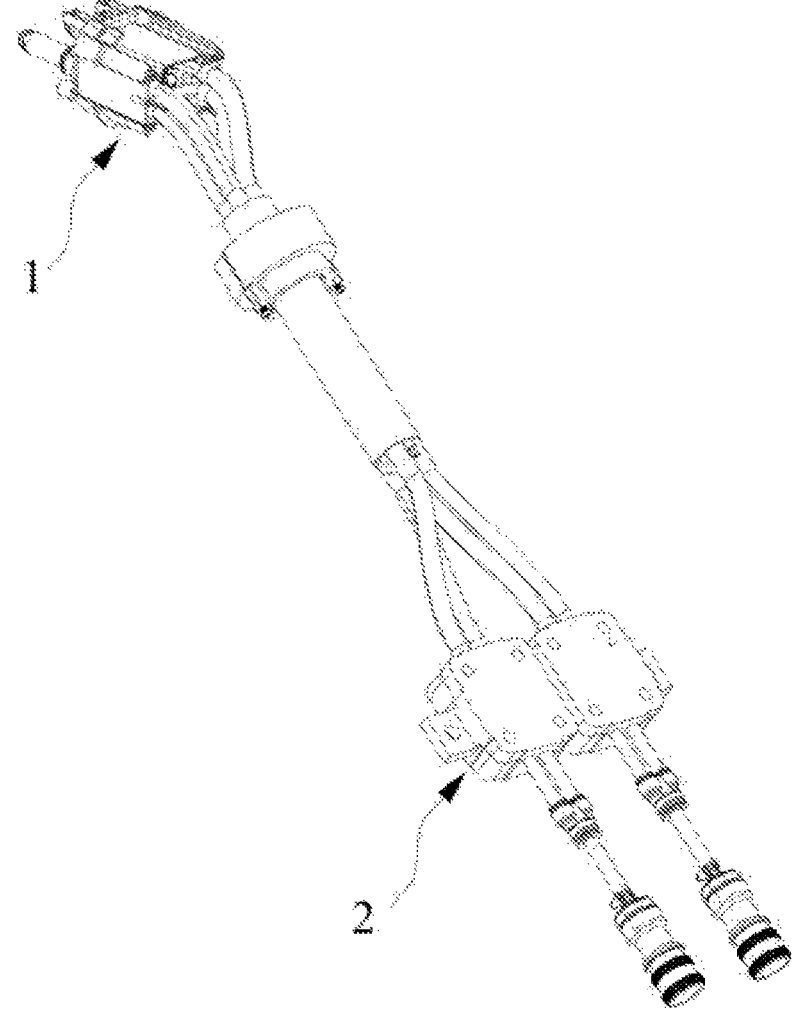
FIG. 2 is a view illustrating the structure of a charging gun cooling system according to embodiments of the present disclosure.

100 first terminal
101 cable connection face
200 second terminal
300 first conductive member
301 connection hole
400 first cable
401 second conductive member
500 second cable
1 head cooling assembly
11 support frame
12 cooling cavity
121 liquid inlet
122 liquid outlet
123 case
1231 flow deflector
124 case cover
1201 first liquid storage region
1202 second liquid storage region
1203 communication region
13 first heat conductive member
14 second heat conductive member
15 temperature detector
2 tail cooling assembly
21 connection box
211 box body
2111 first lower through groove
2112 second lower through groove
2113 third lower through groove
2114 first annular groove
212 cover
2121 first upper through groove
2122 second upper through groove
2123 protruding block
2124 second annular groove
2125 injection hole
213 first seal ring
214 second seal ring
215 third seal ring
216 seal strip
3 liquid inlet pipe
4 liquid outlet pipe
5 three-way pipe

DETAILED DESCRIPTION

The technical solution of the present disclosure is described clearly and completely below in conjunction with drawings. Apparently, the described embodiments are part, not all, of embodiments of the present disclosure. Based on the embodiments of the present disclosure, all other embodiments obtained by those of ordinary skill in the art without creative work are within the scope of the present disclosure.

In the description of the present disclosure, it is to be noted that orientations or position relations indicated by terms such as "center", "upper", "lower", "left", "right", "vertical", "horizontal", "in", and "out" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present disclosure, it is to be noted that unless otherwise expressly specified and limited, the term "mounted", "connected to each other", or "connected" should be construed in a broad sense as securely connected, detachably connected, or integrally connected; mechanically connected or electrically connected; directly connected to each other or indirectly connected to each other via an intermediary; or interconnected between two components. For those of ordinary skill in the art, specific meanings of the preceding terms in the present disclosure may be understood based on specific situations.

The embodiments of the present disclosure are described in detail below, and examples of the embodiments are illustrated in the drawings, where the same or similar reference numerals indicate the same or similar elements or elements having the same or similar functions. The embodiments described below with reference to the drawings are merely exemplary and intended to explain the present disclosure, and are not to be construed as limiting the present disclosure.

Embodiment One

As shown in FIGS. 2 to 9, this embodiment provides a charging gun cooling system. The charging gun cooling system includes a head cooling assembly 1, a liquid inlet pipe 3 and a liquid outlet pipe 4. The head cooling assembly 1 includes a support frame 11 and a cooling cavity 12. The cooling cavity 12 is provided with a liquid inlet 121 and a liquid outlet 122. The support frame 11 is configured to accommodate a connection end of a first terminal 100 and a connection end of a second terminal 200. The cooling cavity 12 is disposed in the support frame 11 and between the first terminal 100 and the second terminal 200. The liquid inlet pipe 3 communicates with the liquid inlet 121. The liquid outlet pipe 4 communicates with the liquid outlet 122. An outer surface of the liquid inlet pipe 3 is for a first cable 400 to be laid on. An outer surface of the liquid outlet pipe 4 is for a second cable 500 be laid on. The first cable 400 is connected to the connection end of the first terminal 100. The second cable 500 is connected to the connection end of the second terminal 200. Optionally, the first cable 400 may be ultrasonically welded to the first terminal 100, and the second cable 500 may be ultrasonically welded to the second terminal 200. In some embodiments, the first terminal 100 is a positive terminal, the first cable 400 is a positive cable, the second terminal 200 is a negative terminal, and the second cable 500 is a negative cable.

In this embodiment, with this configuration, the heat generated at the joint between the first cable 400 and the connection end of the first terminal 100 and the heat generated at the joint between the second cable 500 and the connection end of the second terminal 200 can be transferred to the cooling cavity 12, a coolant that enters the cooling cavity 12 via the liquid inlet 121 flows out of the liquid outlet 122 after absorbing the heat so that the heat can be taken away, thus reducing the temperature at the joint between the first cable 400 and the connection end of the first terminal 100 and the temperature at the joint between the second cable 500 and the connection end of the second terminal 200. Moreover, with this configuration in which the first cable 400 is laid along the liquid inlet pipe 3 and the second cable 500 is laid along the liquid outlet pipe 4, the temperature of the whole first cable 400 and the temperature of the whole second cable 500 can be reduced so that the charging efficiency is improved and the damage to the charging gun is reduced.

Figure 5:
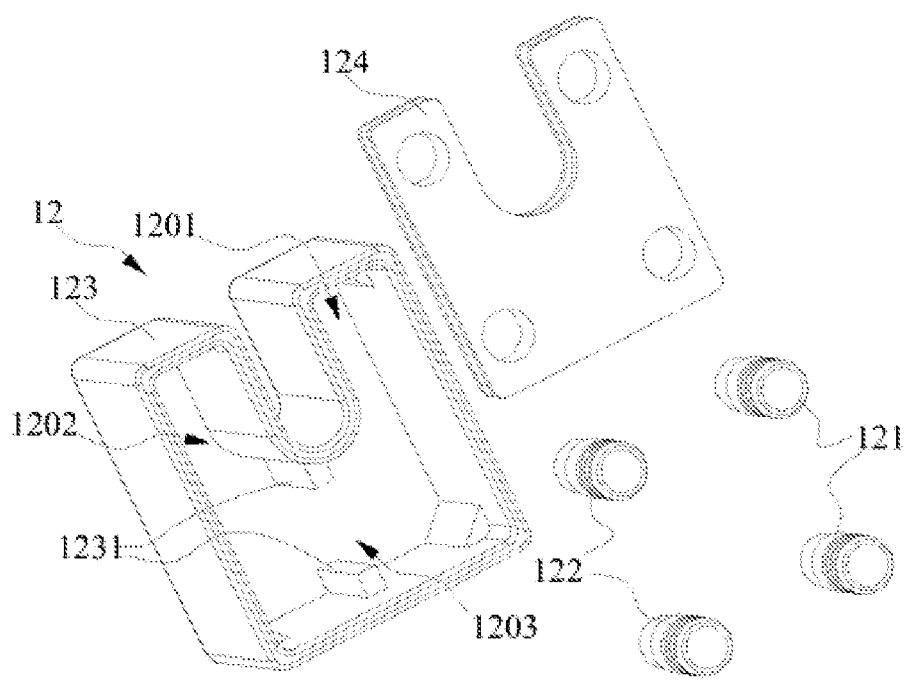
FIG. 5 is an exploded view of a cooling cavity according to embodiments of the present disclosure.

In conjunction with FIG. 5, to prevent the coolant from immediately entering the liquid outlet 122 after entering the cooling cavity 12 via the liquid inlet 121, in this embodiment, in an embodiment, the cooling cavity 12 includes a first liquid storage region 1201, a second liquid storage region 1202 and a communication region 1203 connecting the first liquid storage region 1201 and the second liquid storage region 1202, the liquid inlet 121 communicates with the first liquid storage region 1201, the liquid outlet 122 communicates with the second liquid storage region 1202, the first liquid storage region 1201 is adjacent to the connection end of the first terminal 100, and the second liquid storage region 1202 is adjacent to the connection end of the second terminal 200. With this configuration, the heat generated at the connection end of the first terminal 100 and the heat generated at the connection end of the second terminal 200 enter the cooling cavity 12 via the sidewall of the first liquid storage region 1201 and the sidewall of the second liquid storage region 1202 respectively so that the heat transfer efficiency can be improved.

Further, an inner wall of the cooling cavity 12 is provided with a flow deflector 1231, and the flow deflector 1231 is positioned at the communication region 1203 and extends a predetermined height along the height direction of the cooling cavity 12. With the configuration of the preceding structure, the coolant can flow along the sidewall of the first liquid storage region 1201, the sidewall of the second liquid storage region 1202 and the sidewall of the communication region 1203 as much as possible so that the flow path of the coolant can be ameliorated, thus expanding the contact area between the flowing coolant and the cooling cavity 12 and improving the cooling effects of the cooling cavity 12 on the connection end of the second terminal 200 positioned on one side of the cooling cavity 12 and the connection end of the first terminal 100 positioned on the other side of the cooling cavity 12.

Further, two flow deflectors 1231 are provided and are an upper flow deflector 1231 and a lower flow deflector 1231 so that the coolant that enters the cooling cavity 12 via the upper liquid inlet 121 needs to pass through the upper flow deflector 1231 before entering the upper liquid outlet 122 and so that the coolant that enters the cooling cavity 12 via the lower liquid inlet 121 needs to pass through the lower flow deflector 1231 before entering the lower liquid outlet 122, thus further optimizing the flow path of the coolant. The cooling cavity 12 may be made of heat conductive ceramics. The cooling cavity 12 includes a case 123 and a case cover 124. When the case cover 124 covers the case 123, a seal chamber for containing the coolant is formed. In an embodiment, the case 123 is provided with a stopper strip. The stopper strip is configured to stop the case cover 124. Further, the flow deflector 1231 has the same length as the stopper strip, and the flow deflector 1231 is also configured to stop the case cover 124. In an embodiment, the case cover 124 is provided with a seal groove in a circumferential direction, and when the case cover 124 covers the case 123, the seal groove and the inner wall of the case 123 form an end seal chamber, and an annular sealing member is disposed inside the end seal chamber. Optionally, a pressing plate (not shown) is connected to the support frame 11, and the case cover 124 tightly abuts against the stopper strip and the flow deflector 1231.

When the liquid inlet pipe 3 or the liquid outlet pipe 4 is blocked during use, the charging gun cooling system cannot perform cooling work so that the temperature of the first terminal 100 and the temperature of the second terminal 200 increase, causing damage to the charging gun. In an embodiment, two liquid inlets 121 and two liquid outlets 122 are provided, each liquid inlet 121 communicates with one liquid inlet pipe 3, each liquid outlet 122 communicates with one liquid outlet pipe 4, the two liquid inlets 121 are spaced apart in the first liquid storage region 1201 along the height direction of the cooling cavity 12, and the two liquid outlets 122 are spaced apart in the second liquid storage region 1202 along the height direction of the cooling cavity 12. With this configuration, when one of the liquid inlet pipes 3 or one of the liquid outlet pipes 4 is blocked, the other one of the liquid inlet pipes 3 or the other one of the liquid outlet pipes 4 continues transferring the coolant so that the cooling work on the first terminal 100 and the second terminal 200 is not affected, thereby improving the smoothness of the charging work. Optionally, the liquid inlet 121 is connected to the liquid inlet pipe 3 via a hose clamp, and the liquid outlet 122 is connected to the liquid outlet pipe 4 via a hose clamp.

Optionally, the case cover 124 is provided with four installation holes. The two liquid inlets 121 and the two liquid outlets 122 are each installed in a respective one of the four installation holes. This configuration provides guidance for installing the liquid inlets 121 and the liquid outlets 122, improving the installation efficiency.

Figure 6:
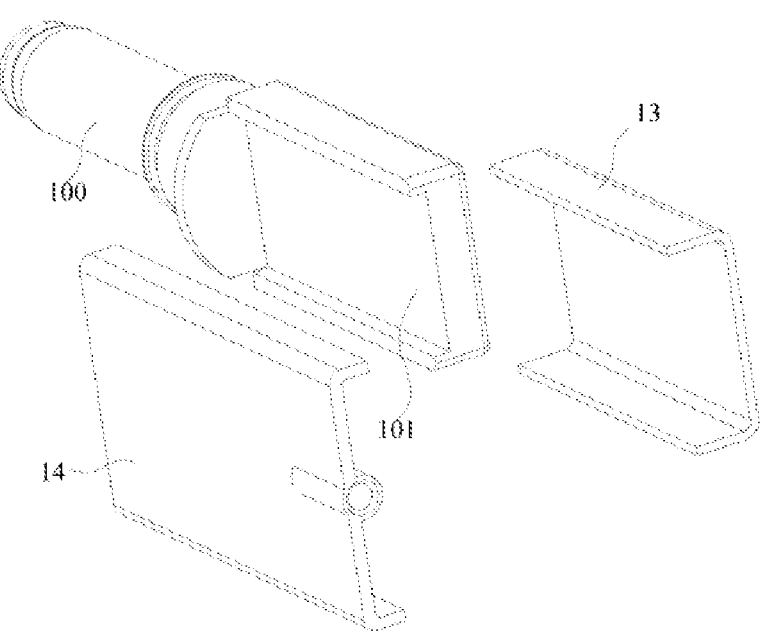
FIG. 6 is an exploded view of a first terminal, a first heat conductive member and a second heat conductive member according to embodiments of the present disclosure.

In conjunction with FIG. 6, in an embodiment, the head cooling assembly 1 further includes a first heat conductive member 13, and the first heat conductive member 13 is disposed between the connection end of the first terminal 100 and the cooling cavity 12 and/or between the connection end of the second terminal 200 and the cooling cavity 12. In some embodiments, the first heat conductive member 13 is made of a heat conductive material having a resilient property or a cushioning property, heat conductive silica gel. The configuration of the first heat conductive member 13, on the one hand, can improve the heat transfer efficiency between the connection end of the first terminal 100 and the cooling cavity 12 and/or between the connection end of the second terminal 200 and the cooling cavity 12, and on the other hand, can avoid the rigid impact between the connection end of the first terminal 100 and the cooling cavity 12 and/or between the connection end of the second terminal 200 and the cooling cavity 12.

Further, the head cooling assembly 1 further includes a second heat conductive member 14, and the second heat conductive member 14 is disposed between the connection end of the first terminal 100 and the support frame 11 and/or between the connection end of the second terminal 200 and the support frame 11. In some embodiments, the second heat conductive member 14 is made of a heat conductive material having a resilient property or a cushioning property. Optionally, the second heat conductive member 14 is made of heat conductive nylon. The configuration of the second heat conductive member 14, on the one hand, can improve the heat transfer efficiency between the connection end of the first terminal 100 and the support frame 11 and/or between the connection end of the second terminal 200 and the support frame 11, and on the other hand, can avoid the rigid impact between the connection end of the first terminal 100 and the support frame 11 and/or between the connection end of the second terminal 200 and the support frame 11.

Figure 3:
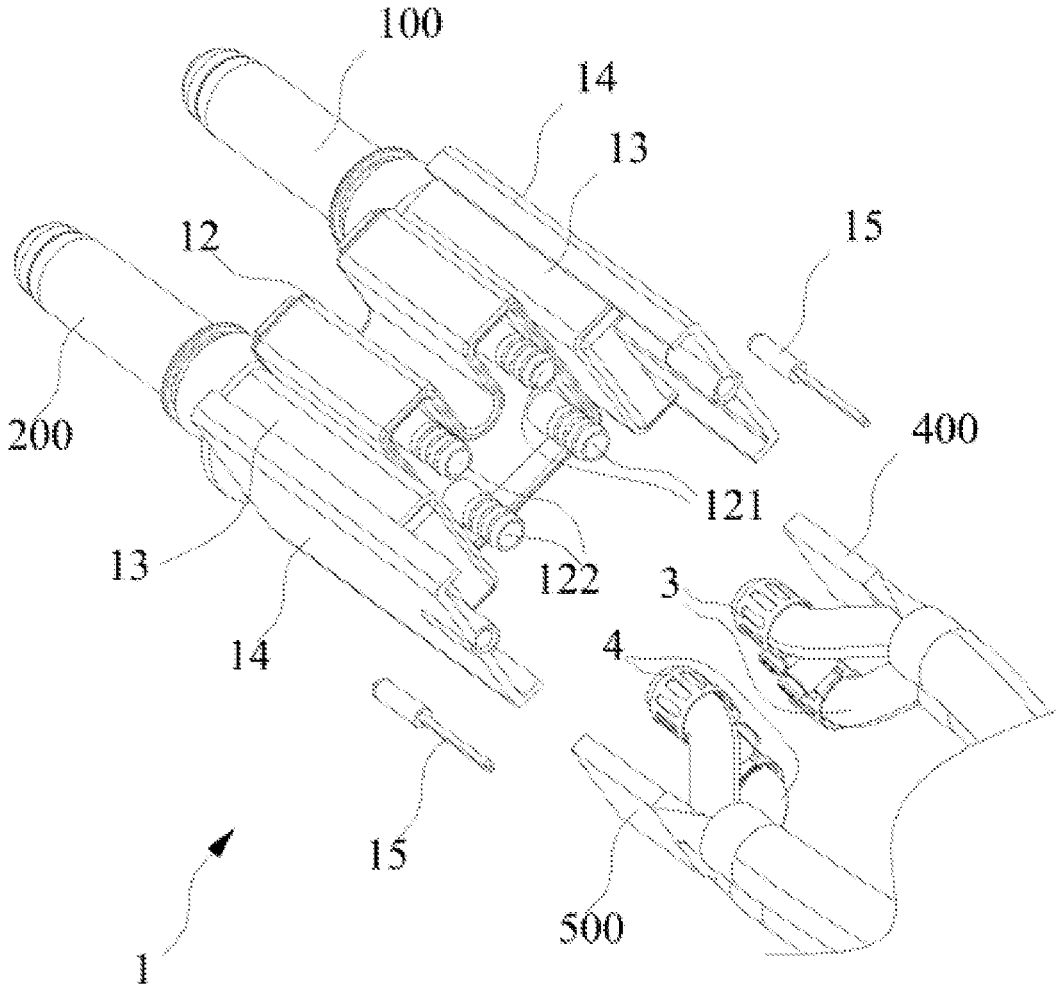
FIG. 3 is an exploded view of a head cooling assembly excluding a support frame according to embodiments of the present disclosure.
Figure 4:
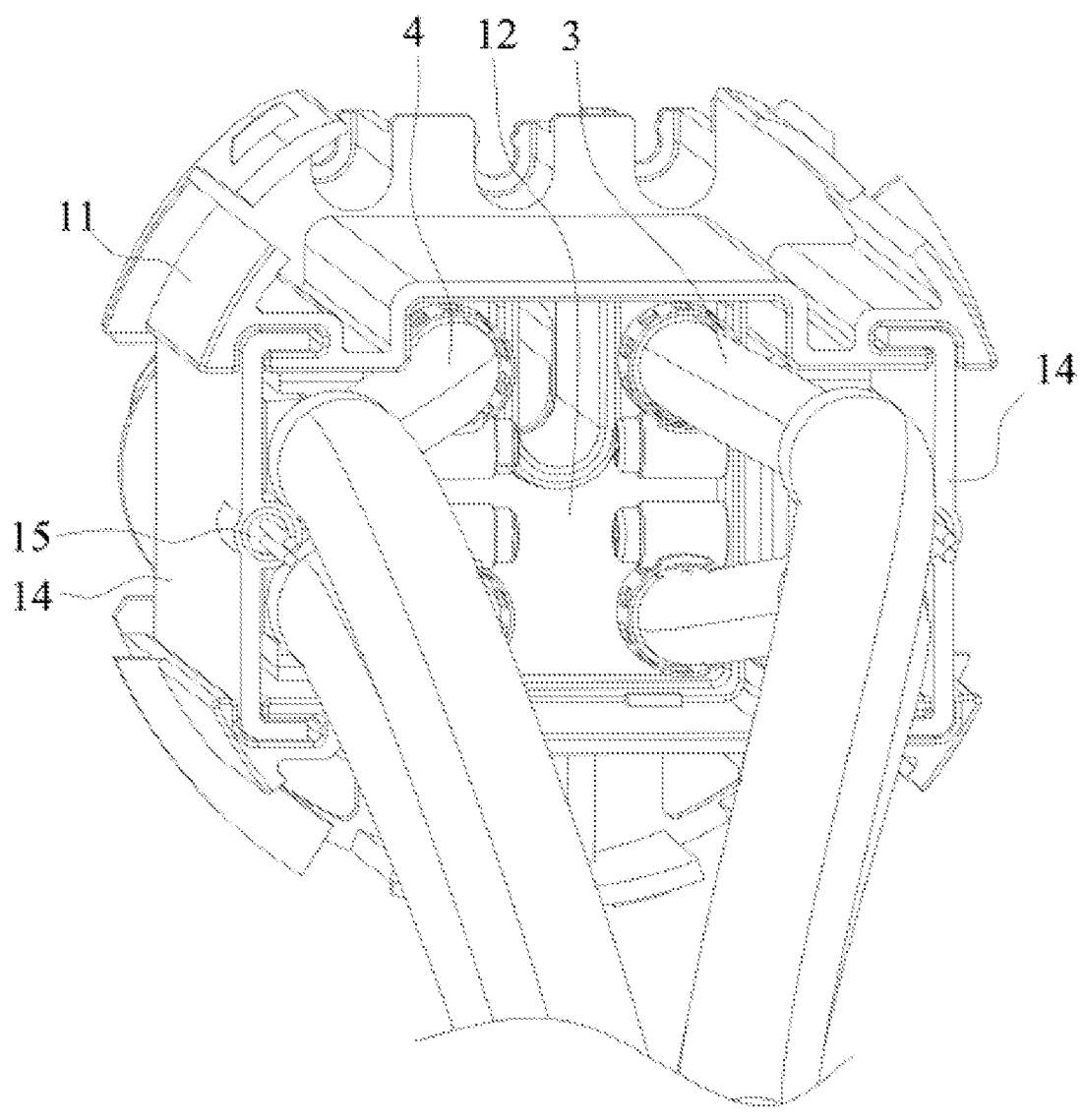
FIG. 4 is a view illustrating the structure of a head cooling assembly according to embodiments of the present disclosure.

In conjunction with FIG. 3, in an embodiment, the head cooling assembly 1 further includes a temperature detector 15, the second heat conductive member 14 is provided with an installation groove, and the temperature detector 15 is disposed inside the installation groove and configured to detect a temperature at the connection end of the first terminal 100 and/or a temperature at the connection end of the second terminal 200. This configuration can accurately detect the temperature of the first terminal 100 and/or the temperature of the second terminal 200, thus preventing dangerous accidents from happening.

In an embodiment, the connection end of the first terminal 100 and the connection end of the second terminal 200 are each flat plate-shaped and each have a planar cable connection face 101, and the cable connection face 101 is vertical to the direction in which the first terminal 100 and the second terminal 200 are arranged. With this configuration, the secure connection to the first cable 400 or the second cable 500 is easily implemented.

Figure 7:
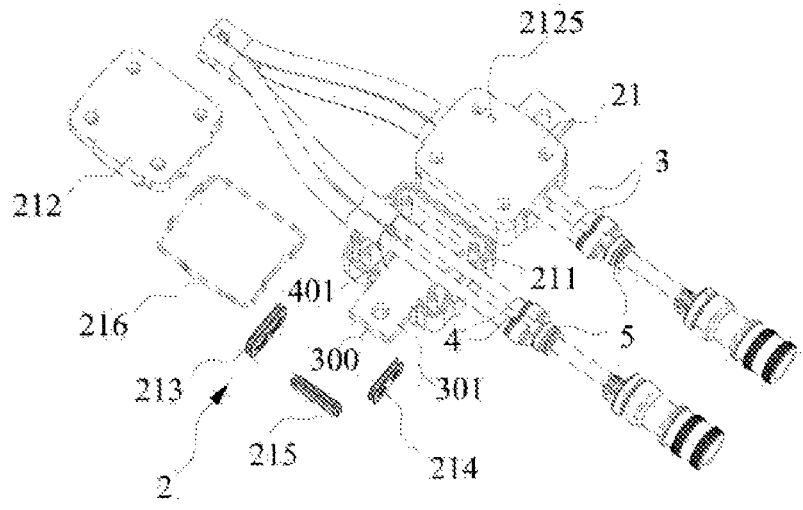
FIG. 7 is an exploded view of a tail cooling assembly according to embodiments of the present disclosure.

In conjunction with FIG. 7, in an embodiment, the charging gun cooling system further includes a tail cooling assembly 2. The tail cooling assembly 2 includes two connection boxes 21. Each connection box 21 accommodates part of a first conductive member 300. The first conductive members 300 in the two connection boxes 21 are respectively for the first cable 400 and the second cable 500 to be connected to. The liquid inlet pipe 3 and the liquid outlet pipe 4 each extend through the respective one of the two connection boxes 21. With this configuration of the tail cooling assembly 2, the heat at the joint between the first cable 400, the second cable 500 and the first conductive member 300 can be taken away by the liquid inlet pipe 3 so that the temperature at the joint can be reduced, thereby reducing the charging risk.

Figure 8:
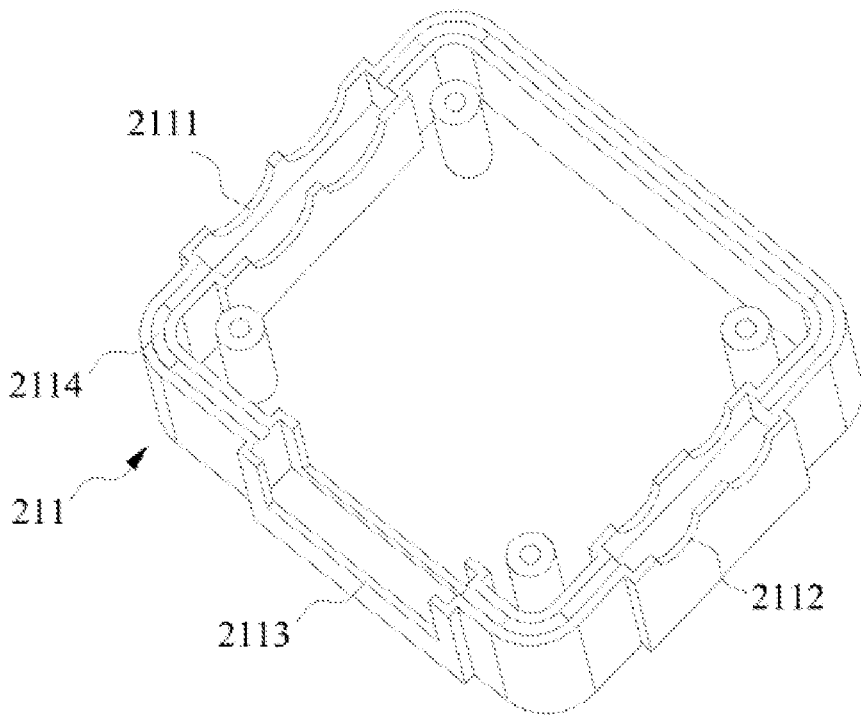
FIG. 8 is a view illustrating the structure of a box body according to embodiments of the present disclosure.
Figure 9:
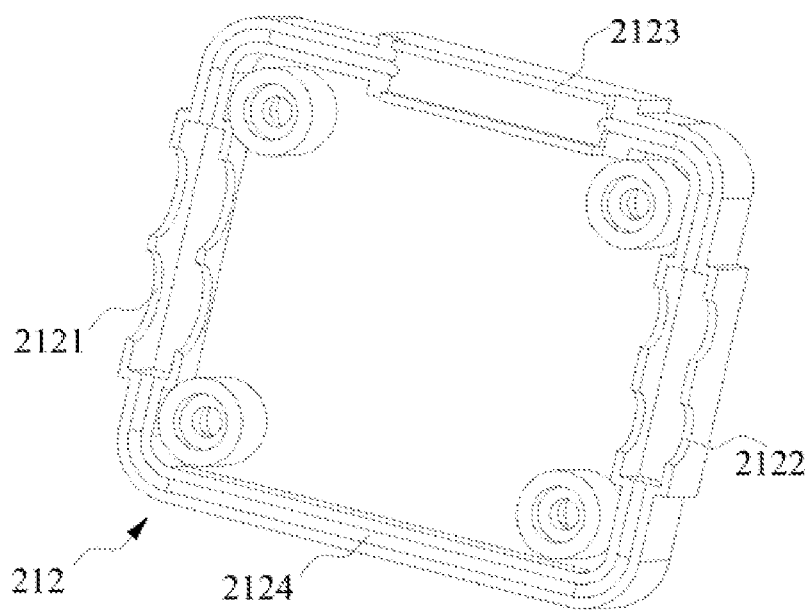
FIG. 9 is a view illustrating the structure of a cover according to embodiments of the present disclosure.

Referring to FIGS. 8 and 9, as for the structure of each connection box 21, in this embodiment, specifically, each connection box 21 includes a box body 211 and a cover 212, the box body 211 is provided with a first lower through groove 2111, a second lower through groove 2112 and a third lower through groove 2113, the cover 212 is provided with a first upper through groove 2121, a second upper through groove 2122 and a protruding block 2123; and when the cover 212 covers the box body 211, the first lower through groove 2111 and the first upper through groove 2121 form a first channel, the second lower through groove 2112 and the second upper through groove 2122 form a second channel, the third lower through groove 2113 and the protruding block 2123 form a third channel, the liquid inlet pipe 3 and the liquid outlet pipe 4 each extend into the respective one of the two connection boxes 21 via the second channel and then out of the first channel, and the first conductive member 300 extends into each connection box 21 via the third channel. This configuration facilitates installing the liquid inlet pipe 3, the liquid outlet pipe 4, the first conductive member 300 and the cables, and such a structure having semi-closed through grooves or a protruding block facilitates generating the box body 211 and the cover 212. On the other hand, the fitting between the protruding block 2123 and the third lower through groove 2113 can also effectively avoid the installation shift between the box body 211 and the cover 212.

In an embodiment, the first cable 400 and the second cable 500 are both connected to the first conductive member 300 via a second conductive member 401. In an embodiment, the second conductive member 401 is a copper sheet, and the first conductive member 300 is a copper busbar, and the copper sheet is ultrasonically welded to the copper busbar. Further, the first conductive member 300 is provided with a connection hole 301, and an external conductive wire extends through the connection hole 301 and then is fastened to the first conductive member 300. The configuration of the preceding structure enables a more reliable connection between the second conductive member 401 and the external conductive wire.

In this embodiment, the connection between the box body 211 and the cover 212 may be a threaded connection. Specifically, the box body 211 is provided with a first connection column, the first connection column is provided with a screw hole, the cover 212 is provided with a second connection column, the second connection column is provided with a through hole, and when the cover 212 covers the box body 211, a locking screw extends through the through hole and is screwed to the screw hole. Further, an end of the second connection column is provided with a positioning groove, the through hole communicates with the positioning groove, and when the cover 212 covers the box body 211, the first connection column is inserted into the positioning groove.

Optionally, each connection box 21 further includes a first seal ring 213, a second seal ring 214 and a third seal ring 215. The first seal ring 213, the second seal ring 214 and the third seal ring 215 are configured to seal the first channel, the second channel and the third channel respectively. In this embodiment, with this configuration of the first seal ring 213, the second seal ring 214 and the third seal ring 215, the internal space of each connection box 21 can be isolated from the external environment so that inside each connection box 21, the joint between the first conductive member 300 and the first cable 400 or the joint between the first conductive member 300 and the second cable 500 can be prevented from being exposed to moisture, thereby improving the security property of the cooling system.

Figure 10:
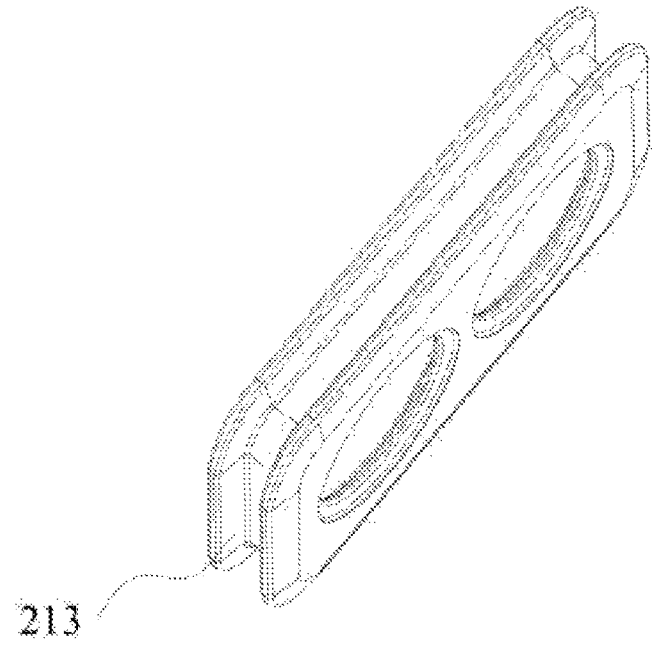
FIG. 10 is a view illustrating the structure of a first seal ring according to embodiments of the present disclosure.

In conjunction with FIG. 10, further, the first seal ring 213, the second seal ring 214 and the third seal ring 215 are each provided with an annular avoidance groove in a circumferential direction, each connection box 21 further includes a seal strip 216, the end face of the box body 211 facing the cover 212 is provided with a first annular groove 2114, the end face of the cover 212 facing the box body 211 is provided with a second annular groove 2124, and when the cover 212 covers the box body 211, the first annular groove 2114, the second annular groove 2124 and the annular avoidance groove form a seal chamber, and the seal strip 26 is disposed inside the seal chamber. With this configuration of the preceding structure, the sealing effects of the two connection boxes 21 can be further improved.

Further, the cover 212 is provided with an injection hole 2125, and the heat dissipation glue is injected into each connection box 21 via the injection hole 2125. With this configuration, the sealing effect inside each connection box 21 can be further improved, the heat generated at the joint between the first conductive member 300 and the first cable 400 can be easily transferred to the liquid inlet pipe 3 or the sidewall of each connection box 21, and the heat generated at the joint between the first conductive member 300 and the second cable 500 can be easily transferred to the liquid outlet pipe 4 or the sidewall of each connection box 21. In this manner, the heat dissipation speed can be improved. Additionally, each connection box 21 is sealed under the action of the first seal ring 213, the second seal ring 214, the third seal ring 215 and the seal strip 216, so that the heat dissipation glue does not leak during the injection process.

In an embodiment, a sidewall of the first channel is provided with a first avoidance groove, a sidewall of the second channel is provided with a second avoidance groove, a sidewall of the third channel is provided with a third avoidance groove. The first seal ring 213, the second seal ring 214 and the third seal ring 215 are disposed inside the first avoidance groove, the second avoidance groove and the third avoidance groove respectively. This configuration enables a more reliable connection between the first seal ring 213, the second seal ring 214, the third seal ring 215 and each connection box 21.

Optionally, two first cables 400, two second cables 500, two liquid inlet pipes 3 and two liquid outlet pipes 4 are provided. The two first cables 400 are each laid along the outer surface of a respective one of the two liquid inlet pipes 3. The two second cables 500 are each laid along the outer surface of a respective one of the two liquid outlet pipes 4. With this configuration, when one of the two first cables 400 or one of the two second cables 500 is damaged, the charging gun can still function normally. An insulating sleeve is encased around the first cable 400 and the liquid inlet pipe 3, and an insulating sleeve is also encased around the second cable 500 and the liquid outlet pipe 4.

In this embodiment, optionally, the two liquid inlet pipes 3 are connected to a cooling pump via one three-way pipe 5 and one adapter, and the two liquid outlet pipes 4 are connected to the cooling pump via another three-way pipe 5 and another adapter. With this configuration, the arrangement of pipes can be reduced, the installation efficiency of the cooling system can be improved, and the transfer of the cooling gun can be facilitated.

Optionally, the head cooling assembly 1 and the tail cooling assembly 2 each include a leakage detector, and the leakage detector is configured to detect leaked liquid. With this configuration, a liquid leak, when occurring in the head cooling assembly 1 or the tail cooling assembly 2, can be detected by the leakage detector, thus reducing the risks of the charging gun.

Embodiment Two

In conjunction with FIGS. 1 to 6, this embodiment further provides a charging gun that includes the charging gun cooling system, the first terminal 100, the second terminal 200, the first cable 400 and the second cable 500 in the proceeding solution. The connection end of the first terminal 100 and the connection end of the second terminal 200 are both disposed in the support frame 11, the cooling cavity 12 is positioned between the first terminal 100 and the second terminal 200, the outer surface of the liquid inlet pipe 3 is for the first cable 400 to be laid on, the first cable 400 is connected to the connection end of the first terminal 100, the outer surface of the liquid outlet pipe 4 is for the second cable 500 to be laid on, and the second cable 500 is connected to the connection end of the second terminal 200. With this configuration, the heat generated at the connection end of the first terminal 100 and the heat generated at the connection end of the second terminal 200 can be effectively led out so that the temperature at the connection end of the first terminal 100 and the temperature at the connection end of the second terminal 200 can be effectively reduced. Additionally, the heat generated by the first cable 400 and the heat generated by the second cable 500 can be also taken away by the coolant so that the temperature can be reduced.

In an embodiment, the connection end of the first terminal 100 and the connection end of the second terminal 200 are each flat plate-shaped and each have a planar cable connection face 101, one end of the first cable 400 is secured to the cable connection face 101 of the first terminal 100 in a distributed manner, and one end of the second cable 500 is secured to the cable connection face 101 of the second terminal 200 in the distributed manner. With this configuration, a secure and good connection to the first cable 400 or the second cable 500 is easily implemented.

In an embodiment, the head cooling assembly 1 further includes the first heat conductive member 13 and the second heat conductive member 14, the first conductive member 13 encases the connection end of the first terminal 100 and leaves the cable connection face 101 of the first terminal 100 exposed and/or encases the connection end of the second terminal 200 and leaves the cable connection face 101 of the second terminal 200 exposed, the second heat conductive member 14 is disposed between the connection end of the first terminal 100 and the support frame 11 and/or between the connection end of the second terminal 200 and the support frame 11, the first heat conductive member 13 and the second heat conductive member 14 are each U-shaped, and the opening of the first heat conductive member 13 and the opening of the second heat conductive member 14 are opposite to each other. With this configuration, the heat generated at the connection end of the first terminal 100 and the heat generated at the connection end of the second terminal 200 are dissipated by use of heat transfer, thereby achieving an obvious cooling effect. The second heat conductive member 14 is connected to the first cable 400 or the second cable 500, so the second heat conductive member 14 cannot be tightly fitted against the cable connection face 101. Therefore, in an embodiment, inside the support frame 11, a gap between the support frame 11, the cooling cavity 12, the first heat conductive member 13 and the second heat conductive member 14 is sealed by the heat conductive glue injected, especially the gap between the cable connection face 101 and the second heat conductive member 14. This configuration can further improve the internal heat transfer effect, thus reducing the charging risk. With the configuration of the preceding structure, the heat conductive structures can encase the connection end of the first terminal 100 and the connection end of the second terminal 200 so that the heat transfer area of the connection end of the first terminal 100 and the heat transfer area of the connection end of the second terminal 200 can be expanded, thus more easily transferring the heat out and achieving a better cooling effect.

Apparently, the preceding embodiments of the present disclosure are only illustrative of the present disclosure and are not intended to limit the implementations of the present disclosure. For those of ordinary skill in the art, changes or alterations in other different forms may also be made based on the preceding description. Implementations of the present disclosure cannot be and do not need to be all exhausted herein. Any modifications, equivalent substitutions, and improvements made within the spirit and principle of the present disclosure fall within the scope of the claims of the present disclosure.

What is claimed is:

1. A charging gun cooling system, comprising:
a head cooling assembly comprising a support frame and a cooling cavity, wherein the cooling cavity is provided with a liquid inlet and a liquid outlet, the support frame is configured to accommodate a connection end of a first terminal and a connection end of a second terminal, and the cooling cavity is disposed in the support frame and between the first terminal and the second terminal;
a liquid inlet pipe communicating with the liquid inlet; and
a liquid outlet pipe communicating with the liquid outlet,
wherein an outer surface of the liquid inlet pipe is for a first cable to be laid on, an outer surface of the liquid outlet pipe is for a second cable to be laid on, the first cable is connected to the connection end of the first terminal, and the second cable (500) is connected to the connection end of the second terminal,
wherein the head cooling assembly further comprises a first heat conductive member, and the first heat conductive member is configured to be disposed between the connection end of the first terminal and the cooling cavity and/or between the connection end of the second terminal and the cooling cavity; and
wherein the head cooling assembly further comprises a second heat conductive member, and the second heat conductive member is configured to be disposed between the connection end of the first terminal and the support frame and/or between the connection end of the second terminal and the support frame.

2. The charging gun cooling system according to claim 1, wherein the cooling cavity comprises a first liquid storage region, a second liquid storage region, and a communication region connecting the first liquid storage region and the second liquid storage region, the liquid inlet communicates with the first liquid storage region, the liquid outlet communicates with the second liquid storage region, the first liquid storage region is configured to be adjacent to the connection end of the first terminal, and the second liquid storage region is configured to be adjacent to the connection end of the second terminal.

3. The charging gun cooling system according to claim 2, wherein an inner wall of the cooling cavity is provided with a flow deflector, and the flow deflector is positioned in the communication region and extends a predetermined height along a height direction of the cooling cavity.

4. The charging gun cooling system according to claim 2, wherein two liquid inlets and two liquid outlets are provided, each of the two liquid inlets communicates with one liquid inlet pipe, each of the two liquid outlets communicates with one liquid outlet pipe, the two liquid inlets are spaced apart in the first liquid storage region along a height direction of the cooling cavity, and the two liquid outlets are spaced apart in the second storage region along the height direction of the cooling cavity.

5. The charging gun cooling system according to claim 1, wherein the head cooling assembly further comprises a temperature detector, the second heat conductive member is provided with an installation groove, and the temperature detector is disposed inside the installation groove and configured to detect a temperature at the connection end of the first terminal and/or a temperature at the connection end of the second terminal.

6. The charging gun cooling system according to claim 1, wherein the connection end of the first terminal and the connection end of the second terminal are both flat plate-shaped and each have a planar cable connection face, and the planar cable connection face is vertical to a direction in which the first terminal and the second terminal are arranged.

7. The charging gun cooling system according to claim 1, further comprising a tail cooling assembly, wherein the tail cooling assembly comprises two connection boxes, each of the two connection boxes is configured to accommodate a first conductive member, first conductive members in the two connection boxes are respectively for the first cable and the second cable to be connected to, and the liquid inlet pipe and the liquid outlet pipe each extend through a respective one of the two connection boxes.

8. The charging gun cooling system according to claim 7, wherein the each of the two connection boxes comprises a box body and a cover, the box body is provided with a first lower through groove, a second lower through groove and a third lower through groove, and the cover is provided with a first upper through groove, a second upper through groove and a protruding block; and when the cover covers the box body, the first lower through groove and the first upper though groove form a first channel, the second lower through groove and the second upper through groove form a second channel, the third lower through groove and the protruding block form a third channel, the liquid inlet pipe and the liquid outlet pipe each extend into the respective one of the two connection boxes via the second channel and then out of the first channel, and the first conductive member extends into the each of the two connection boxes via the third channel.

9. The charging gun cooling system according to claim 8, wherein the each of the two connection boxes further comprises a first seal ring, a second seal ring and a third seal ring, and the first seal ring, the second seal ring and the third seal ring are configured to seal the first channel, the second channel and the third channel respectively.

10. The charging gun cooling system according to claim 9, wherein the first seal ring, the second seal ring and the third seal ring are each provided with an annular avoidance groove in a circumferential direction, the each of the two connection boxes further comprises a seal strip, an end face of the box body facing the cover is provided with a first annular groove, and an end face of the cover facing the box body is provided with a second annular groove; and when the cover covers the box body, the first annular groove, the second annular groove and the annular avoidance groove form a seal chamber, and the seal strip is disposed inside the seal chamber.

11. A charging gun, comprising the charging gun cooling system, the first terminal, the second terminal, the first cable and the second cable according to claim 1, wherein the connection end of the first terminal and the connection end of the second terminal are both disposed in the support frame, the cooling cavity is positioned between the first terminal and the second terminal, the first cable is laid on the outer surface of the liquid inlet pipe and connected to the connection end of the first terminal, and the second cable is laid on the outer surface of the liquid outlet pipe and connected to the connection end of the second terminal.

12. The charging gun according to claim 11, wherein the connection end of the first terminal and the connection end of the second terminal are each flat plate-shaped and each have a planar cable connection face, one end of the first cable is secured to the planar cable connection face of the first terminal in a distributed manner, and one end of the second cable is secured to the planar cable connection face of the second terminal in the distributed manner.

13. The charging gun according to claim 12, wherein the head cooling assembly further comprises a first heat conductive member and a second heat conductive member, the first heat conductive member encases the connection end of the first terminal and leaves the planar cable connection face of the first terminal exposed and/or encases the connection end of the second terminal and leaves the planar cable connection face of the second terminal exposed, the second heat conductive member is disposed between the connection end of the first terminal and the support frame and/or between the connection end of the second terminal and the support frame, the first heat conductive member and the second heat conductive member are each U-shaped, and an opening of the first heat conductive member and an opening of the second heat conductive member are opposite to each other.

14. The charging gun according to claim 11, wherein the charging gun cooling system comprises a tail cooling assembly, wherein the tail cooling assembly comprises two connection boxes, each of the two connection boxes is configured to accommodate a first conductive member, first conductive members in the two connection boxes are respectively for the first cable and the second cable to be connected to, and the liquid inlet pipe and the liquid outlet pipe each extend through a respective one of the two connection boxes.

15. The charging gun according to claim 11, wherein the cooling cavity comprises a first liquid storage region, a second liquid storage region, and a communication region connecting the first liquid storage region and the second liquid storage region, the liquid inlet communicates with the first liquid storage region, the liquid outlet communicates with the second liquid storage region, the first liquid storage region is configured to be adjacent to the connection end of the first terminal, and the second liquid storage region is configured to be adjacent to the connection end of the second terminal.

16. The charging gun according to claim 15, wherein an inner wall of the cooling cavity is provided with a flow deflector, and the flow deflector is positioned in the communication region and extends a predetermined height along a height direction of the cooling cavity.

17. The charging gun according to claim 15, wherein two liquid inlets and two liquid outlets are provided, each of the two liquid inlets communicates with one liquid inlet pipe, each of the two liquid outlets communicates with one liquid outlet pipe, the two liquid inlets are spaced apart in the first liquid storage region along a height direction of the cooling cavity, and the two liquid outlets are spaced apart in the second storage region along the height direction of the cooling cavity.

18. The charging gun according to claim 11, wherein the connection end of the first terminal and the connection end of the second terminal are both flat plate-shaped and each have a planar cable connection face, and the planar cable connection face is vertical to a direction in which the first terminal and the second terminal are arranged.

19. The charging gun according to claim 11, wherein a gap between the support frame, the cooling cavity, the first heat conductive member and the second heat conductive member is sealed by injecting a heat conductive glue, the connection end of the first terminal and the connection end of the second terminal are both flat plate-shaped and each have a planar cable connection face, and a gap between the planar cable connection face and the second heat conductive member is sealed by injecting the heat conductive glue.

20. The charging gun cooling system according to claim 1, wherein a gap between the support frame, the cooling cavity, the first heat conductive member and the second heat conductive member is sealed by injecting a heat conductive glue, the connection end of the first terminal and the connection end of the second terminal are both flat plate-shaped and each have a planar cable connection face, and a gap between the planar cable connection face and the second heat conductive member is sealed by injecting the heat conductive glue.

\* \* \* \* \*